United States Patent
Breker et al.

(10) Patent No.: US 8,839,264 B2
(45) Date of Patent: Sep. 16, 2014

(54) MEMORY MANAGEMENT METHOD AND DEVICE IN A MULTITASKING CAPABLE DATA PROCESSING SYSTEM

(75) Inventors: Robert Breker, Ginsheim-Gustavsburg (DE); Alexander Schaeffer, Mering (DE)

(73) Assignee: LFK-Lenkflugkoerpersysteme GmbH, Schrobenhausen (DE)

( * ) Notice: Subject to any disclaimer, the term of this patent is extended or adjusted under 35 U.S.C. 154(b) by 47 days.

(21) Appl. No.: 13/136,796

(22) Filed: Aug. 10, 2011

(65) Prior Publication Data

US 2012/0042324 A1    Feb. 16, 2012

(30) Foreign Application Priority Data

Aug. 13, 2010   (DE) .......................... 10 2010 034 309
Jul. 21, 2011   (DE) .......................... 10 2011 108 077

(51) Int. Cl.
*G06F 9/46*    (2006.01)
*G06F 11/10*   (2006.01)
*G06F 21/74*   (2013.01)

(52) U.S. Cl.
CPC ............ *G06F 11/1004* (2013.01); *G06F 21/74* (2013.01)
USPC ........................................... 718/107; 714/42

(58) Field of Classification Search
None
See application file for complete search history.

(56) References Cited

U.S. PATENT DOCUMENTS

| | | | |
|---|---|---|---|
| 8,276,201 B2 * | 9/2012 | Schunter et al. ................. | 726/22 |
| 2002/0073129 A1 * | 6/2002 | Wang et al. ..................... | 709/102 |
| 2006/0005072 A1 * | 1/2006 | Philippe Conti et al. ......... | 714/5 |
| 2006/0179483 A1 * | 8/2006 | Rozas .............................. | 726/22 |
| 2007/0046680 A1 * | 3/2007 | Hedrick et al. ................. | 345/503 |
| 2007/0294496 A1 * | 12/2007 | Goss et al. ..................... | 711/163 |
| 2008/0216089 A1 * | 9/2008 | Jia et al. ........................ | 719/312 |
| 2008/0313440 A1 * | 12/2008 | Banning et al. ................ | 712/225 |
| 2009/0049220 A1 * | 2/2009 | Conti et al. ..................... | 710/267 |
| 2009/0133112 A1 * | 5/2009 | Kauffman et al. ............... | 726/11 |
| 2009/0217377 A1 * | 8/2009 | Arbaugh et al. ................. | 726/23 |
| 2009/0241189 A1 * | 9/2009 | Shanbhogue et al. ........... | 726/23 |
| 2011/0173482 A1 * | 7/2011 | Penton et al. ..................... | 714/2 |
| 2011/0224903 A1 * | 9/2011 | Romero et al. ................ | 701/301 |
| 2011/0276837 A1 * | 11/2011 | Potter et al. ..................... | 714/42 |
| 2011/0302474 A1 * | 12/2011 | Goss et al. ..................... | 714/758 |

* cited by examiner

*Primary Examiner* — Emerson Puente
*Assistant Examiner* — Mehran Kamran
(74) *Attorney, Agent, or Firm* — Von Rohrscheidt Patents

(57) ABSTRACT

A method for memory space management in a multitasking capable data processing system including a data processing device and software running thereon. The data processing device includes at least one central processing unit (CPU) and at least one user memory, and the software running on the CPU includes a first computer program application and at least a second computer program application which respectively jointly access the user memory used by both computer program applications during execution. Information of the first computer program application is stored in at least a portion of the memory space of the user memory in a temporary manner, and the integrity of the contents memory space is checked after interrupting the execution of the first computer program application. The first computer program application is only executed further when the memory integrity is confirmed through the checking or when the memory integrity has been reestablished.

7 Claims, 6 Drawing Sheets

FIG. 6

```
1  long lastCRCSum=0;
2  void main() {
3    while(true) {
4      disableInterrupts();
5      if(getCRCsum()!=lastCRCSum) {
6        ...
7      } else {
8        doCriticalAction();
9        crcSum=getCRCsum();
10     }
11     enableInterrupts();
12     sched_yield();
13   }
14 }
```

FIG. 7

```
1  SECTIONS
2  {
3      __protected_text_start = .;
4      protected_text : {
5          protected.o (.text);
6      }
7      __protected_text_end = . ;
8      __protected_other_start = .;
9      protected_other : {
10         protected.o
11     }
12     __protected_other_end = .;
13     .text : { *(.text) }
14     .data : { *(.data) }
15     .bss  : { *(.bss)  }
16 }
```

MEMORY MANAGEMENT METHOD AND DEVICE IN A MULTITASKING CAPABLE DATA PROCESSING SYSTEM

RELATED APPLICATIONS

This application incorporates by reference and claims priority from both German patent application DE 10 2010 034 309.9 filed on Aug. 13, 2010 and German patent application DE 10 2011 108 077.9 filed on Jul. 21, 2011.

FIELD OF THE INVENTION

The present invention relates to a memory management method in a multitasking capable data processing system. It furthermore relates to a computer system for performing the method and to a computer program product. The invention furthermore relates to integrating security relevant software in a software controllable device.

BACKGROUND OF THE INVENTION

When a security relevant software runs on a software controllable device, wherein the software is, for example, indispensible for a reliable and secure function of the device and assuring the function is a prerequisite for operating the device, it has to be assured that the security relevant software is not rendered dysfunctional through external interferences, for example, through other software which also runs together with the security relevant software on a computer of the device. Interferences of this type can occur, for example, when the non-security relevant software changes or deletes information (data or commands) of the security relevant software that is stored in an intermediary manner in a user memory.

Therefore security relevant software has to be separated from non-security relevant software physically and also time-based in order to exclude mutual influencing among other things in case of an error. This is required for a proof of security as it has to be provided to some extent for IEC 61 508, a standard for security relevant programmable systems.

In a scenario that will be described infra it is presumed that a multitasking capable operating system is operated on a system without sufficient security integrity. The operating system has complete access to the entire hardware. A security relevant component shall be executed on the system. The security relevant component does not use any services or functions of the operating system for performing its function.

Though no separation is provided between components, a security relevant component shall be able to assure its own integrity and thus security at all times.

Without separation, components rated at a lower level have complete access to the memory of the security relevant component. Thus, any memory contents of the security relevant component can be written over due to an error. This may have no consequences in a best case scenario, it may lead to a crash of the security relevant component or it may also impair the function and the behavior of the security relevant component. The two latter cases are risky and have to be avoided. This risk can be mitigated by assuring the memory's integrity.

Memory integrity means that the condition of one component, the memory associated with one component can only be changed by executing the component itself and cannot be changed by third parties. This assures that the security relevant component always performs the function implemented therein and no other function. The points in time at which the memory integrity can be violated can be clearly limited. Violations can occur when lower rated components are executed. Thus system integrity only has to be provided exactly when the security relevant component is not active.

FIG. 1 illustrates a known control device 1 including a processer 10 and a security relevant operating system 11 which is certified for assuring memory integrity and a security relevant and certified first control unit 12 and another non-security relevant and thus non-certified control unit 13. The control units 12, 13 are respectively connected with sensors 14, 15 and respectively put out signals to actuators 16, 17.

FIG. 2 illustrates a known control device 2 as an alternative design for a secure computer system which includes two processors 20, 21. An independent operating system 22, 23 runs on each of the processors and each of the processors includes a proprietary control unit 24, 25. In order to provide the required security, the processor 20 is provided with a security relevant operating system 22 and a security relevant control unit 24. The security relevant operating system 22 and also the security relevant control unit 24 have to be certified according to the respectively applicable security regulations, for example, according to IEC 61 508. The control units 24, 25 are respectively connected with sensors 16, 27 and respectively put out signals to actuators 28, 29. The configuration in FIG. 2 furthermore requires that a memory management unit (MMU) is provided on the hardware platform. Without a MMU the software that is not security relevant per se becomes security relevant.

FIG. 3 illustrates a known control device representing another configuration of a secure computer system, wherein the control device includes two hardware configurations 30, 31 that are independent from one another, wherein one hardware configuration 30 is certified. The certified hardware configuration includes a hardware control unit which is configured as a certified security relevant control unit 32. The other non-security relevant hardware configuration 31 includes an operating system 33 and a control unit 34 configured as software. The two hardware configurations 30, 31 are respectively connected with sensors 36, 37 for providing input signals and are respectively connected with actuators 38, 39 for putting out control signals.

As an alternative to the operating system typically a security relevant hypervisor is being used. The hypervisor can either play the role of an operating system like in FIG. 2 or execute two different operating systems, wherein one of them is security relevant or it can simulate two discreet hardware platforms as illustrated in FIG. 3 on which operating systems are executed respectively.

The known designs for secure computer systems have complex configurations and high certification complexity.

BRIEF SUMMARY OF THE INVENTION

Thus it is an object of the present invention to provide a simple and cost-effective method for memory management in a multitasking capable data processing system on which it is assured that a security relevant software is not impaired with respect to its functionality through memory accesses performed by a non-security relevant software in order to be able to execute security relevant software together with other software on one control device. Furthermore a computer system and a computer program product shall be provided that implement the method.

The object is achieved according to a method for memory space management in a multitasking capable data processing system including running software on a data processing device having at least one central processing unit and at least one user memory, wherein the software includes a first computer program application and at least a second computer program application which respectively jointly access the at least one user memory used by both the first and second computer program applications during execution, wherein information of the first computer program application is stored in at least a portion of the memory space of the user memory in a temporary manner, wherein the integrity of the contents memory space is checked after interrupting the execution of the first computer program application, and wherein the first computer program application is only executed further when the memory integrity is confirmed through the checking or when the memory integrity has been reestablished.

In this memory management method in a multitasking capable data processing system with a data processing device and software running thereon, wherein the data processing system includes at least one central processing unit (CPU) and at least one user memory and wherein the software running on the CPU includes a first (security relevant) computer program application and at least a second (non-security relevant) computer program application wherein both applications access the user memory during execution that is respectively jointly used by both computer program applications, wherein information of the first computer program application is temporarily stored in at least a portion of the memory space of the user memory the integrity of the contents of the memory space is checked after an interruption of the execution of the first computer program application and the first computer program application only continues to be executed when the memory integrity is either confirmed through the checking or when the memory integrity has been reestablished.

This way the method according to the invention provides that the first, security relevant program application is not crashed by a memory error. Substantial additional advantages of the invention are:

No security relevant (certified) operating system or a hypervisor or possibly additional security relevant software are required;

The additionally required computing time is typically lower than when using a security relevant operating system or hypervisor;

The hardware does not require a memory management unit (MMU), less storage space is required; and Hardware, development and maintenance costs are less.

A first exemplary embodiment of the method according to the invention is characterized in that the information of the first computer program application is at least stored twice in the memory space of the user memory and in that after reading out a first information from the memory space of the user memory and before processing the information further in the first computer program application the read out first information is compared with the second information that is stored in parallel and the memory integrity is verified when both coincide. Thus, in this embodiment the memory contents are stored in a redundant manner and compared with one another in order to verify memory integrity. The advantage of this method is that the required computing capacity is minimal, wherein however the memory space requirement is high due to the redundant storage.

A second alternative advantageous embodiment of the method according to the invention is characterized in that information of the first computer program application stored in the storage space of the user memory is computed before storing a check sum which is stored together with the information that after reading the information out of the storage space of the user memory and in that before further processing the information in the first computer program application the check sum is computed again, compared with the stored check sum and the memory integrity is verified when there is coincidence. In this embodiment the storage space requirement is minimized, however computing capacity is required for computing the check sums. The computation of a check sum is provided quicker than a comparison or a copy of memory contents since only half the number of memory accesses is required.

In this second exemplary embodiment of the method according to the invention an advantageous improvement is characterized in that the first computer program application is executed in a loop, wherein before reading the information out of the memory space of the user memory and computing the check sum all interrupt routines are switched off which could interrupt the first computer program application and wherein the interrupt routines are only turned on again when the information is stored again in the operating memory after computing the new check sum.

An alternative advantageous improvement of the second embodiment requires that an independent scheduler for the first computer program application is provided in the data processing system which manages functions to be executed by the first computer program application and which is independent from schedulers for managing other computer program applications running on the data processing device. This alternative embodiment is characterized in that after calling up the independent scheduler for the first computer program application initially all interrupt routines which could interrupt the first computer program application are switched off before the information of the first computer program application is fetched that is stored in the storage space of the user memory; and in that the interrupt routines are only turned on again by the scheduler when at least one of the functions to be performed by the first computer program application has been executed and the information of the first computer program application has been stored again in the memory space of the user memory. This embodiment has the advantage over the preceding embodiment that preventive multitasking can also be used for the security relevant computer program application.

The portion of the object relating to the computer system is achieved through a computer system including a multitasking capable execution environment in which a first computer program application and at least a second computer program application run wherein the execution environment includes at least one central processing unit and at least one user memory device for checking the integrity of contents of memory space of the at least one user memory and devices through which it is reported to the first computer program application that the first computer program application can continue to run when memory integrity was verified during checking.

The computer system according to the invention is provided with a multitasking capable execution environment in which one first computer program application and at least one second computer program application run, wherein the execution environment includes at least CPU and at least one user memory. The computer system according to the invention is characterized by means for checking the integrity of the contents of storage space of the at least one user memory and means through which it is reported to the first computer program application that it can continue to run when the memory integrity was verified during the check. A computer system or a data processing system according to the present invention includes hardware and software.

"Running on a computer" or "running in an execution environment" means that the system including a computer program and a computer performs a method which can be configured like following the method for memory space management in a multitasking capable data processing system including running software on a data processing device having at least one central processing unit and at least one user memory, wherein the software includes a first computer program application and at least a second computer program application which respectively jointly access the at least one user memory used by both the first and second computer program applications during execution, wherein information of the first computer program application is stored in at least a portion of the memory space of the user memory in a temporary manner, wherein the integrity of the contents memory space is checked after interrupting the execution of the first computer program application, and wherein the first computer program application is only executed further when the memory integrity is confirmed through the checking or when the memory integrity has been reestablished. This method may also include:

- The information of the first computer program application is at least stored twice in the memory space of the user memory as a first information and a second information, and after reading out the first information from the storage locations of the user memory and before processing the first information further in the first computer program application the first information is compared to the second information that is stored in parallel and the memory integrity is verified when there is coincidence.
- A check sum is computed for the information of the first computer program application before storing the information of the first computer program application in the storage space of the user memory, the check sum is stored together with the information of the first computer program application, and after reading the information of the first computer program application from the memory space of the user memory and before further processing the information in the first computer program application the check sum is computed again and compared with the stored check sum and the memory integrity is verified when both coincide.
- The first computer program application is executed in a loop, before reading the information from the memory space of the user memory and computing the check sum all interrupt routines are turned off which could interrupt the first computer program application, and the interrupt routines are only turned on again when the information is stored in the user memory again after computing the new check sum.
- An independent scheduler for the first computer program application is provided in the data processing system, the independent scheduler manages tasks to be performed by the first computer program application and the scheduler is independent from the schedulers for managing other computer program application running on the data processing device, after calling up an independent scheduler for the first computer program application initially all interrupt routines which could interrupt the first computer program application are turned off before the information of the first computer program application stored in the memory space of the user memory is called up, and the interrupt routines are only turned on again by the scheduler when at least one of the tasks to be performed by the first computer program application has been performed and the information of the first computer program application has been stored again in the storage space of the user memory.

The above invention furthermore relates to a computer program product which can be directly loaded into a user memory of a digital computer system and includes software code sections which are configured to execute the method steps according the above.

"Loaded on a computer" means that the computer that is programmed in this way is capable or configured to perform a method which can be configured like the method according to a method for memory space management in a multitasking capable data processing system including running software on a data processing device having at least one central processing unit and at least one user memory, wherein the software includes a first computer program application and at least a second computer program application which respectively jointly access the at least one user memory used by both the first and second computer program applications during execution, wherein information of the first computer program application is stored in at least a portion of the memory space of the user memory in a temporary manner, wherein the integrity of the contents memory space is checked after interrupting the execution of the first computer program application, and wherein the first computer program application is only executed further when the memory integrity is confirmed through the checking or when the memory integrity has been reestablished and thus represents a system or a device which can be configured like the computer system according a computer system including a multitasking capable execution environment in which a first computer program application and at least a second computer program application run wherein the execution environment includes at least one central processing unit and at least one user memory device for checking the integrity of contents of memory space of the at least one user memory and devices through which it is reported to the first computer program application that the first computer program application can continue to run when memory integrity was verified during checking.

In a particularly advantageous manner, a computer program product is provided which is stored on a medium that is computer compatible and includes the following:

- Computer readable program means which cause a computer to monitor the execution of a computer program application;
- Computer readable program means which cause the computer to check the integrity of the contents of storage space of the at least one user memory; and
- Computer readable program means which cause the computer to put out a report to the computer program application that it can continue to run when memory integrity was verified during the checking.

Certainly the computer program product according to the invention can also be provided with computer readable program means which can perform an execution of method steps specified in the following:

- The information of the first computer program application is at least stored twice in the memory space of the user memory as a first information and a second information, and after reading out the first information from the storage locations of the user memory and before processing the first information further in the first computer program application the first information is compared to the second information that is stored in parallel and the memory integrity is verified when there is coincidence.
- A check sum is computed for the information of the first computer program application before storing the information of the first computer program application in the storage space of the user memory, the check sum is stored together with the information of the first computer program application, and after reading the information of the first computer program application from the memory space of the user memory and before further processing the information in the first computer program application the check sum is computed again and compared with the stored check sum and the memory integrity is verified when both coincide.

The first computer program application is executed in a loop, before reading the information from the memory space of the user memory and computing the check sum all interrupt routines are turned off which could interrupt the first computer program application, and the interrupt routines are only turned on again when the information is stored in the user memory again after computing the new check sum.

An independent scheduler for the first computer program application is provided in the data processing system, the independent scheduler manages tasks to be performed by the first computer program application and the scheduler is independent from the schedulers for managing other computer program application running on the data processing device, after calling up an independent scheduler for the first computer program application initially all interrupt routines which could interrupt the first computer program application are turned off before the information of the first computer program application stored in the memory space of the user memory is called up, and the interrupt routines are only turned on again by the scheduler when at least one of the tasks to be performed by the first computer program application has been performed and the information of the first computer program application has been stored again in the storage space of the user memory.

A particularly advantageous application of the invention is integrating security relevant software in a software controllable device which includes a software supported computer with at least one CPU and one operating system, with at least one memory, a first software that is security relevant with respect to the function of the device and at least one other additional lower ranking software which is not security relevant with a watch dog circuit implemented as hardware which controls the processes of the first software and initiates a reset at least in one secured mode in case of a malfunction, wherein for an alternating access of the first and the second software to the memory for each alternation a check sum is computed over the memory content and the check sum is compared with the second check sum which is computed after another switch to a security relevant software and wherein in case of non-coincidence of the check sums the memory content is reactivated before the switching.

This integration is advantageously implemented for a device which is configured as an aircraft with data link monitoring.

BRIEF DESCRIPTION OF THE DRAWINGS

Exemplary embodiments of the invention with additional configuration details and advantages are subsequently described in more detail with reference to the appended drawing figures, wherein:

FIG. 6 illustrates an embodiment of an implementation of the method according to the invention in a program loop; and FIG. 7 illustrates a linker script for integrity checking.

DETAILED DESCRIPTION OF THE INVENTION

Figure 4:
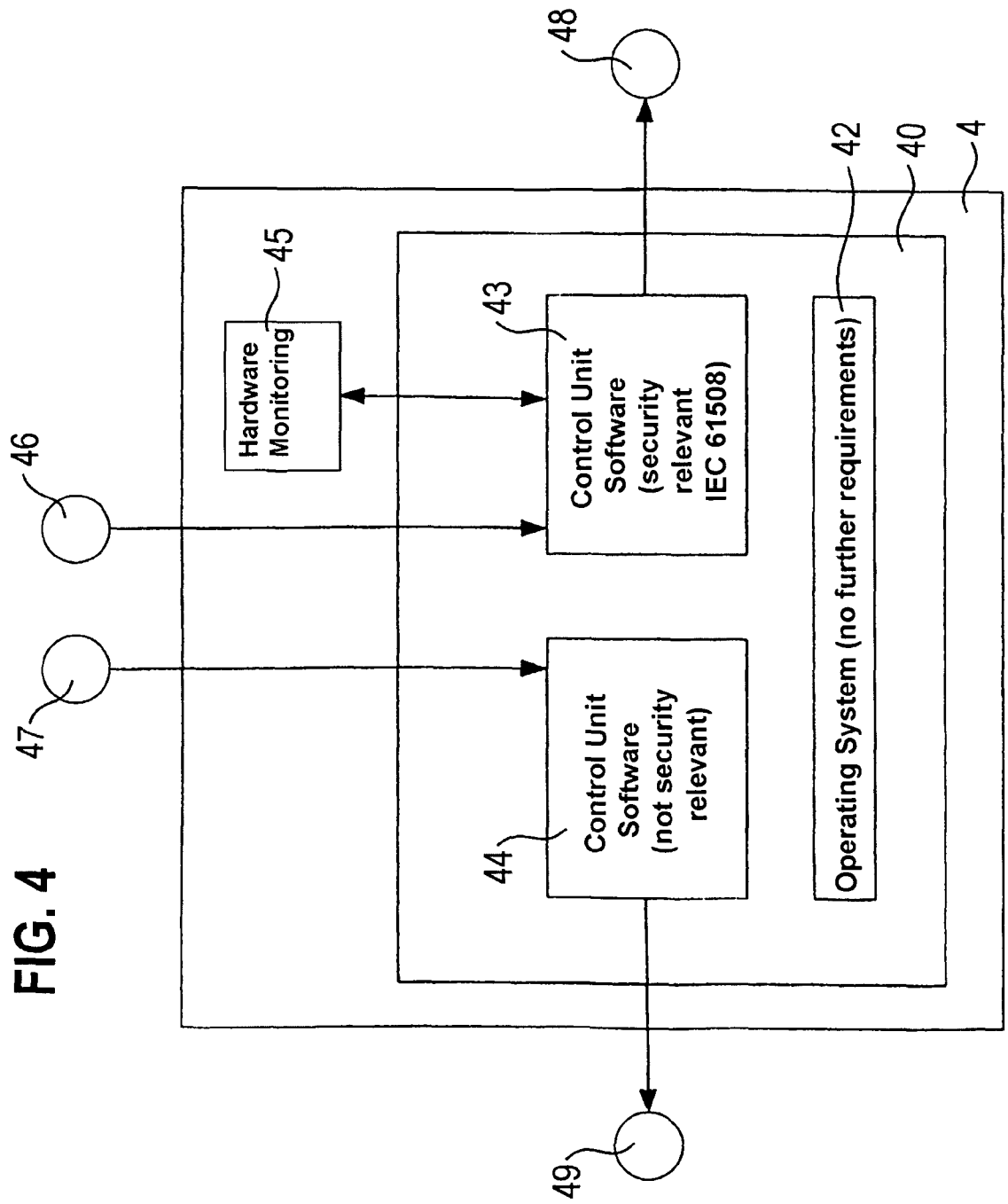
FIG. 4 illustrates a general application of the method according to the invention.

FIG. 4 illustrates a general application according to the present invention. This application includes a control device 4 with only one processer 40 and a non-certified operating system 42 and a security relevant and certified first control unit and another non-security relevant and thus not certified control unit 44. The security relevant control unit 43 is associated with a so-called watch dog 45. The security relevant control unit 43 is furthermore connected with sensors 46 only schematically illustrated in FIG. 4, wherein the sensors provide sensor signals to the control unit 43. The security relevant control unit 43 in turn transmits control signals to actuators 48 that are only schematically illustrated. Also the non-security relevant control unit receives signals from sensors 47 connected therewith and transmit signals to actuators 49 connected therewith. Control units 43 and 44 are implemented in software.

Figure 5:
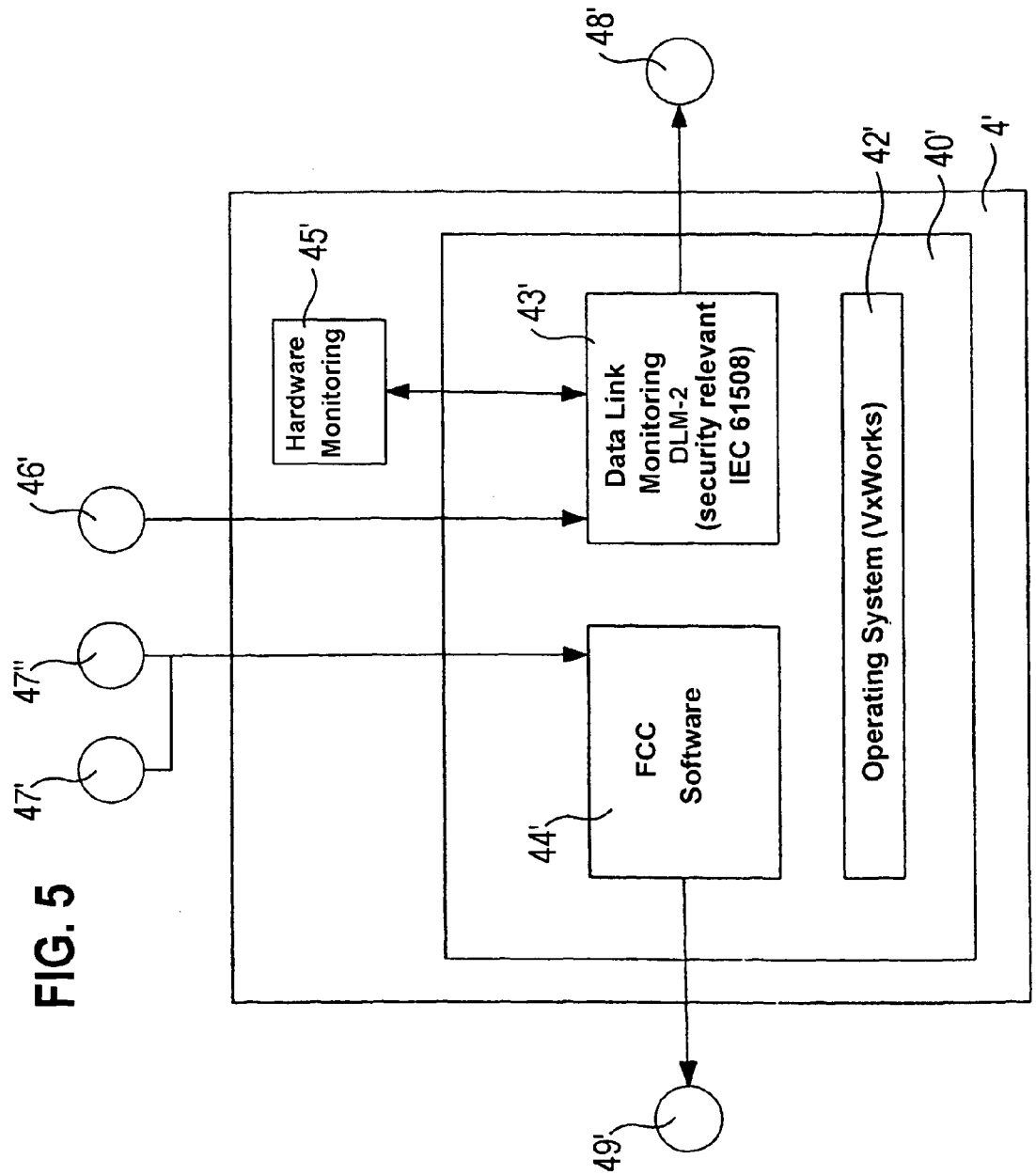
FIG. 5 illustrates a project-specific application analogous to the application in FIG. 6 for data link monitoring in a flight control computer.

FIG. 5 illustrates a particular application of the general application according to the invention illustrated in FIG. 4. This project-specific application is a data link monitoring of a guided missile. The control device is formed herein by a flight control computer (FCC) 4' and the processer is a power PC processer (PPC) 40'. A VxWorks operating system is used for an operating system 42'. In this project-specific application, the security relevant control unit configured as software is a data link transmission 43' which is associated with a monitoring device 45' that is configured as hardware.

The signals received through the sensor input of the data link monitoring device 43 come from a data link receiver 46' of the guided missile and the signals put out by the data link monitoring device 43' are put out to actuators 48' of a control surface control system of the guided missile.

The control unit 44' which is not security relevant and also configured as software includes the software of the flight control computer which receives signals from a seeker head 47' and from an inertial measuring unit (IMU) 47". The control signals put out by the control software 44' of the flight control computer are also put out to actuators 49' of the control surface control system.

In order to assure that the security relevant control unit 43 configured as software, for example, the data link monitoring 43' is not interfered with through memory accesses of the non-security relevant control unit 44, for example, the software 44' of the flight control computer, that the access of the non-security relevant control unit to memory space occupied by the security relevant control unit does not change or delete stored information (data or commands) of the security relevant control unit, the integrity of the contents of the storage space occupied by the security relevant control unit that is configured as software is checked after interrupting the execution of the security relevant control unit. The software of the security relevant control unit is only executed when the memory integrity is confirmed by the check. This checking of the memory integrity can be performed, for example, in two different manners.

A first option of checking the memory integrity is to provide all memory contents in a redundant manner. When comparing the contents it is excluded with rather high probability that the memory contents have been written over two times with exactly the same values. The problem is therein that no probability for this can be determined. The problem can be mitigated through a controlled encryption of the memory contents as a function of the copy or through adding particular keys as a function of the copy.

A second even simpler option for checking the memory integrity is using check sums for the memory contents. Based on check sums it can be verified with a computable probability that the memory contents included in the check sum are unchanged. The advantage when using a check sum is that twice the memory capacity is not required. Furthermore computing the check sum is quicker than a comparison or a copy of memory contents since only half of the memory accesses are required. Based on the advantages the following only describes the solution with the check sum. In order to assure memory integrity through a check sum, the check sum has to be computed before each context change by a security relevant component of the program application. After changing towards a security relevant component of the program application the check sum is computed again and compared with the last value. When they coincide, the integrity is assured and the security relevant component of the program application can continue its execution.

It is an option for implementing this second embodiment to implement the security relevant component of the program application in a loop as illustrated in FIG. 6. The task with the loop is thus scheduled as a completely normal kernel mode task by the operating system without sufficient security integrity. At the beginning of the loop interrupts and thus the scheduling and non-secure interrupt routines are switched off. Thus, interruptions through a non-security relevant software are excluded. Subsequently the check sum is computed and compared with a value previously computed. When the values coincide the integrity is provided. Subsequently the application specific security relevant activities are performed in a separate function. At the end of the loop the check sum is updated, the interrupts are activated again and the control is passed to another task.

Computing the check sum has to include all security relevant memory segments of the task (code segment, data segment, heap). The processer registers and the stack can be left out since they do not include security relevant information while other components can write into the memory. Thus, however it has to be assured that the security relevant functionality is implemented in another function than the integrity check and that the compiler does not compile the security relevant function as an inline function. This can either be facilitated through checking the assembler code or a configuration of the compiler (For example, through the gcc-parameter "f-noinline"; this is the configuration used for a gcc-compiler that is used in an exemplary manner in order to prevent inline functions. Inline means that one function is copied by a compiler into another function, thus it does not exist anymore by itself.).

It is a disadvantage of this type of implementation that the security relevant component has to be implemented in a loop. No preemptive multitasking is taking place. Thus, only non-blocking functions can be used in the component. Furthermore the component itself has to assure that it leaves the loop in a timely manner and passes on the control so that other tasks on the system can maintain their deadlines. However, it is conceivable to execute plural loops in independent tasks respectively in order to keep their complexity low.

Another option for implementing the second embodiment includes a proprietary scheduler for the security relevant component. This has a few advantages but it is significantly more complex. When a particular scheduler is implemented, preemptive multitasking can also be used for the security relevant component. Thus, the security relevant component is not limited to using a loop, but it can be interrupted at any point in time. Thus, also blocking operations can be used.

The proprietary scheduler is then operated as normal kernel mode task in the operating system without sufficient security integrity. The proprietary scheduler manages the tasks of the security relevant component irrespective of the lower graded component and its scheduler. When the proprietary scheduler is called up by the other scheduler it initially deactivates all interrupts again besides the timer interrupt. The interrupt handler of the timer interrupt is changed to a proprietary interrupt handler during the execution of the security relevant component. Eventually the scheduler checks the integrity of the security relevant component. Subsequently it calls up the first security relevant task. For a call up of the interrupt handler the proprietary scheduler can change the tasks just performed or it can continue to perform them as a function of the scheduling algorithm.

After all security relevant tasks are performed or a particular time has elapsed the scheduler generates a new check sum for the component, resets the interrupt handler and activates the other interrupts in the system again. Advantageously plural tasks of a security relevant component shall be performed directly one after the other since the check sum computation does not have to be performed for each task by itself. The integrity check in this type of implementation additionally has to include the stack and the stored processer registers of the particular tasks since they can include security relevant information at any time.

Both options for implementing the second embodiment have one problem in common. It is conceivable that a non-security relevant task jumps due to an error into any code portion of the security relevant component. In order to reduce the risk of this error it is feasible to withdraw the execution rights for the code portions through a memory management unit (MMU) when the security relevant component is not active. However this could be reversed. Furthermore this requires the presence of an MMU.

An option to implement this without using the MMU is that the security relevant code is changed while it is inactive. Thus, the instructions can either be invalidated or encrypted. However, this takes computing time. Furthermore there is another problem. It is conceivable that defective software starts up exactly behind the check sum checking and still before the decryption. Thus, the protective measures would be obviated again. This can be prevented by additionally performing a jump into the protected security relevant function through a function indicator which is placed in front of the check sum computation. This achieves optimum protection. It is sufficiently unlikely that the function pointer is additionally accidentally overwritten with the correct value.

Another conceivable error mode is that exclusively the check sum computation and decryption are overwritten with no-operation (NOP) instructions. This error mode can be excluded based on the low probability.

Subsequently, the implementation of the check sum computation is described.

For the check sum computation the use of cryptographic hash functions md5 or SHA-256 is conceivable like using a method for cyclic redundancy checking like crc-23. Selecting the method can be performed according to different criteria. A prerequisite is in any case that the selected function recognizes changes with the probability required for the security classification. Furthermore the time requirement for computing the check sum is important since this time has to be spent twice for each loop cycle or scheduler call-up. It is less important how much memory is required for the check sum.

It is an argument for the cyclic redundancy checking that it is significantly faster due to the simpler implementation. The check sum has to capture the code segment, the data segment, the heap and possibly the stack and the stored context of a task. It is an open issue how to address the respective memory addresses. When the heap and the stack are implemented themselves, the memory portions provided for this are known. It is furthermore conceivable for the heap to check the particular indicators which refer to dynamically allocated memories. When the stack is not implemented itself, it can often be inquired from the execution environment. Furthermore an iteration can also be performed by the actual SP-value through the back chain values like for a debugger up to the beginning in order to thus determine the stack portion currently used.

However, it is significantly more difficult to detect the positions of the code and data segment. It is conceivable to register all variables from the data segment in a list. The list can subsequently be combined into areas of memory portions to be checked in order to increase speed. However, the approach does not work this way for functions since their sizes, differently from variables, cannot be determined through a size of-operator provided by the compiler.

It is a first alternative to read the memory address and the size of functions and also of variables from the symbol table. For example, the tool "nm" from the GNU "binutils" facilitates displaying the symbol table for Elf files. When secure and non-secure components have to be assembled in an object file, it can be sorted out in the symbol table which entries shall be captured and which entries shall not be captured, however, this approach is laborious.

It is a second simpler alternative to keep secure and non-secure software apart through the memory segments in which they are placed. The association of segments can be influenced by a linker script during linking. Thus, an association with specific memory segments can be provided on the level of the objects or of the C/C++ source files.

Figure 1:
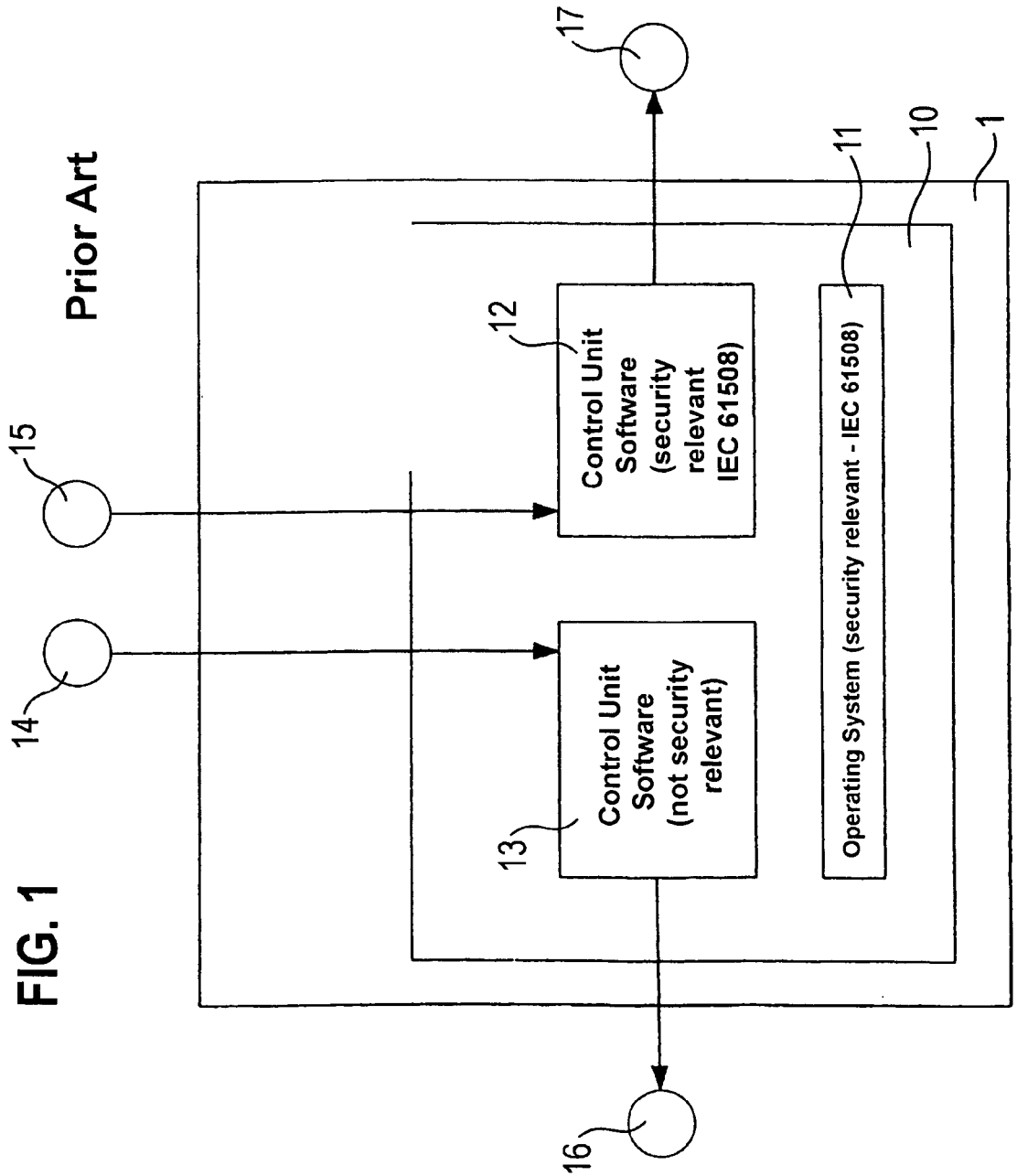
FIG. 1 illustrates a use of a known certified operating system.
Figure 2:
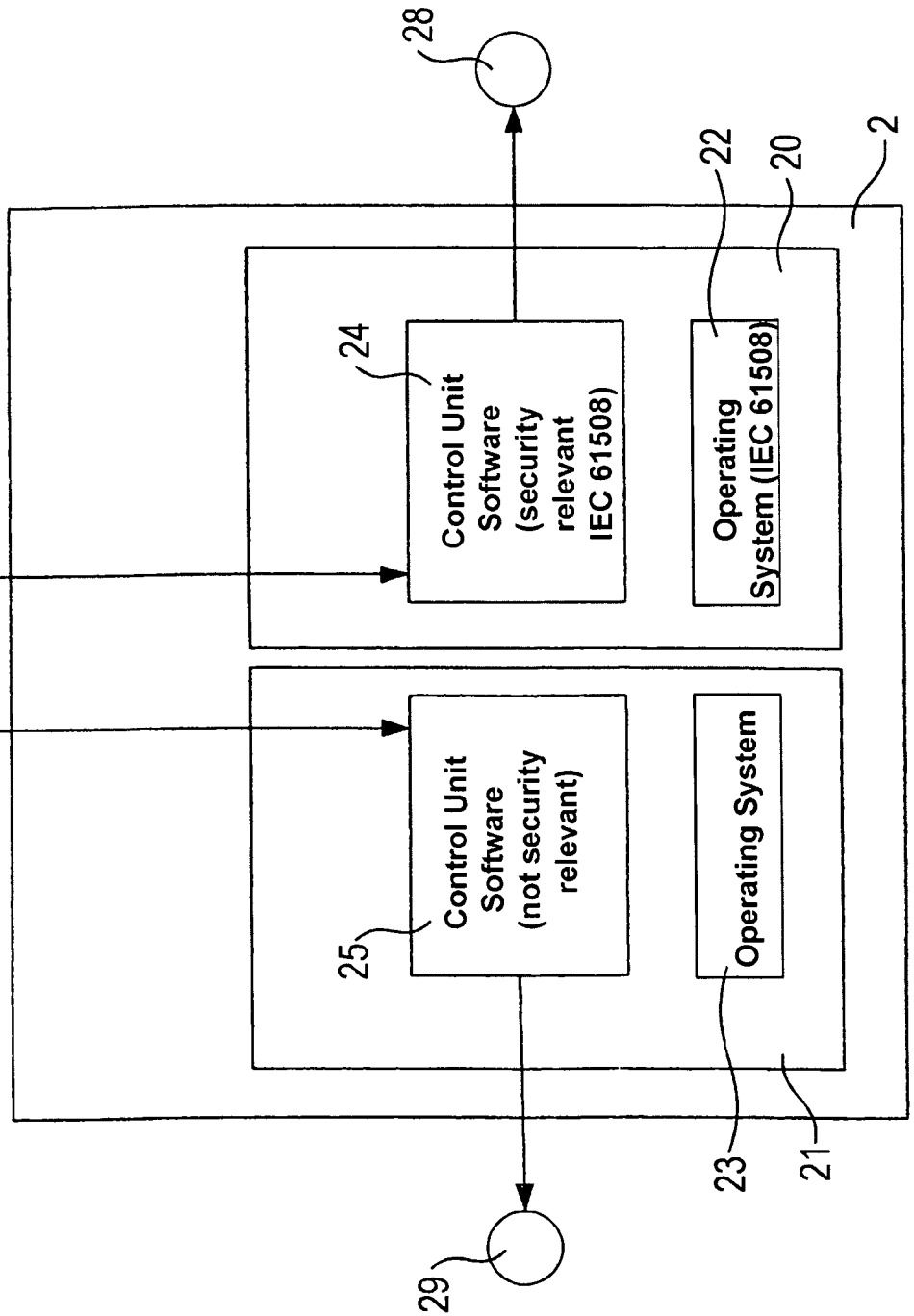
FIG. 2 illustrates a separation through using plural processers in a known manner.
Figure 3:
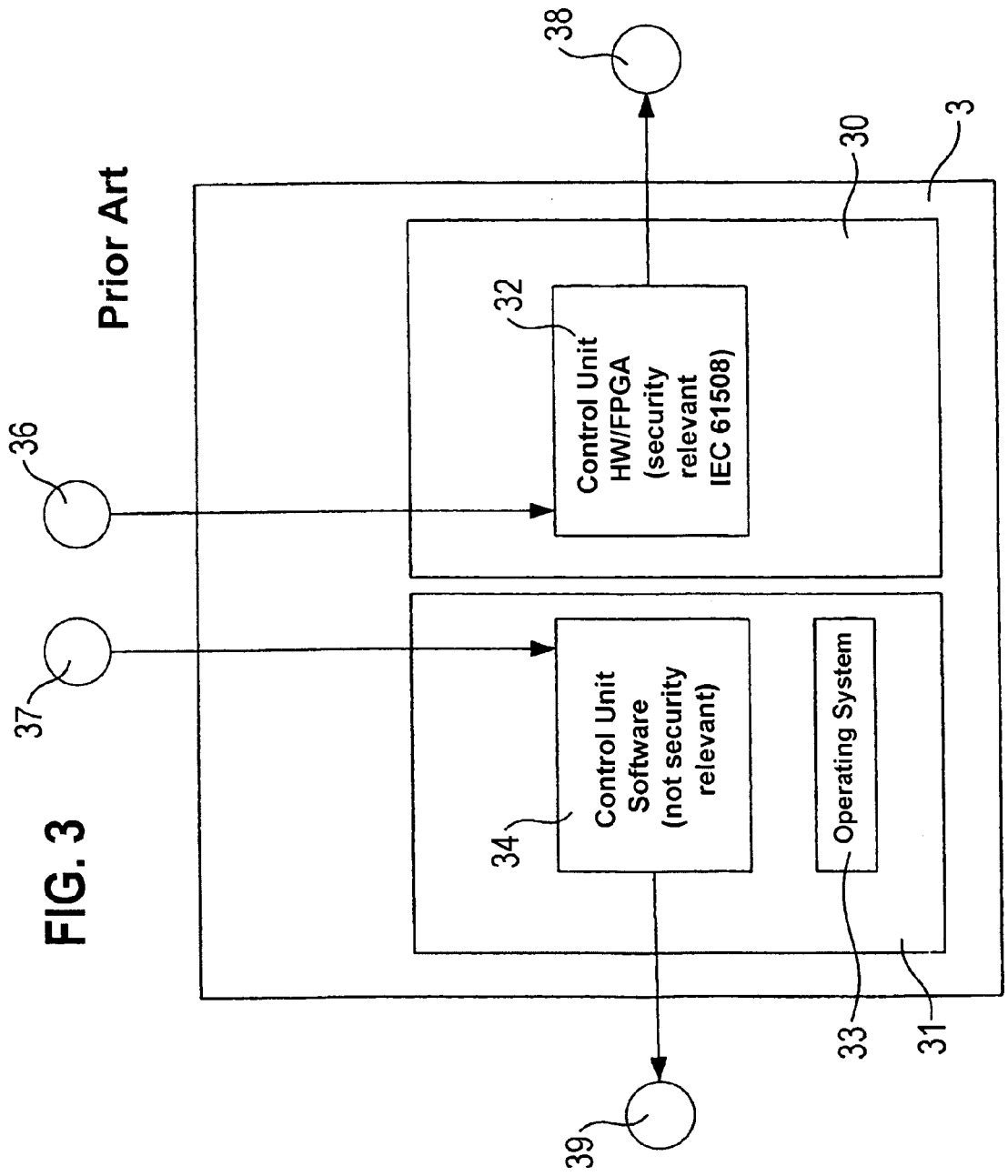
FIG. 3 illustrates a separation by implementing in hardware (HW) in a known manner.

An example for a compatible linker script can be found in FIG. 2. The memory portions determined during linking have to be provided to the software for integrity checking. Thus, symbols are inserted respectively before and behind each segment. The symbols can be used in C-code for addressing. For this purpose, the symbols are designated as external and the address is then accessed through the address operator (&). During linking furthermore a differentiation can also be made between a data and a text segment so that when using a MMU the execution rights can be withdrawn for the data segments and the writing rights can be withdrawn for the code segment.

The check sum already has to be known during the first program application when the security relevant software is not executed before the non-secure software since the software could otherwise be changed before the first execution. For this purpose, the check sum can be computed with a separate program based on the binary file. The program can interrogate the segment information through the tool "obj-dump" and can compute the integrity based on the binary file like the software itself.

However, it is an interesting problem how the check sum of the software that is already linked is announced. It is an option to designate the variable of the check sum in the secure software as external and to define it only through an additional object file. It is another option to not designate the variable as external but to determine the memory address of the variable through the symbol table and the associated value. It is furthermore another option to compile the program again and to place the value of the check sum in the code. In case the actual security relevant code is not changed and no new fields are inserted the check sum also fits in the newly complied program.

The recited three options have equal value. In any case the variable used for computing the check sum must not be included in the computation of the check sum. Updating the check sum can be accelerated in that the check sum is only computed for changed memory portion. A simple method for this is to update the check sum for the data segment at the run time but not the check sum for the code segment. It is another approach to directly recalculate the associated check sum when changing objects. Thus, the check sums are divided into particular objects. For implementation the writing to objects can be encapsulated through a particular function which additionally updates the check sum.

Also checking for memory integrity could be optimized in a similar manner in that respectively only the check sums for the memory portions used are checked.

An important question is how a loss of memory integrity is being reacted to. There are applications in which the loss of memory integrity is tolerable. This is the case, for example, when the source of risk can be deactivated (fail secure or fail-soft).

In other applications a loss of memory integrity is not tolerable since the system shall continue to run (fail-operational). In these cases depending on the type of damaged information the information can be reconstructed. This can be performed, for example, by interrogating sensors, restarting the security relevant component or the complete system. It is furthermore possible through using double redundancy or simple redundancy in combination with the check sum to provide an ability to reconstruct damaged memory contents. In spite of that when losing memory integrity a restart of the entire system is advisable since also the non identifiable component which has caused the error is newly initialized.

Subsequently the behavior of security relevant software is described for non secure scheduling.

For the security relevant component of a computer program application it can generally not be assured without a separation of non security relevant components that the security relevant component is executed at a particular point in time. The lower rated (non-security relevant component) can since it has unrestricted access to the processor turn off the interrupts at any point in time and can thus stop the scheduling. Additionally the scheduling of the lower rated component is actively used in the implementation described so far.

There are applications in which the scheduling does have to be performed in a secure manner. This is the case, for example, when the security relevant component itself performs a dangerous function which does not pose any risk when the security relevant component is not active.

In other applications the scheduling has to be performed in any case. This is the case when the unit initially has to be transferred into a secure condition, so that there is no risk, or because the security relevant function shall also be furthermore offered. In this case it can be assured through an external hardware watch dog 45 (FIG. 4) that the security relevant component based on an error does not receive any computation time during a time period that is too long. For this purpose after checking the memory integrity the watch dog is always notified. When an error occurs the watch dog initiates a hardware reset of the system and thus initiates a restart.

The restart initially shall not restart the entire system but it only has to be assured initially that the security relevant component is executed. The component can transpose the system into a secure condition or can only perform a security relevant function. The remaining system can be restarted subsequently.

It is another option to leave the transposition of the unit into a secure condition up to the hardware watch dog after an error condition in which the system does not introduce any risk. In some applications it can be sufficient when the power supply is cut off from the processor and thus from the non secure software or the actuators. Independently from the specific reaction to the error a consideration of the effect upon the scheduling in case of an error is interesting. The security relevant component thus has a particular period when performing the function. The watch dog can expect a sign of life from the component in this period. When the reaction does not occur in a period the watch dog can restart the system. This creates a delay as a reaction time to a failure, wherein the delay includes the period and the time which the reaction of the watch dog requires itself. The time period thus generated has to be less than the deadline of the security relevant tasks or any security relevant task. In order for the watch dog not to be reset by an error in the non secure software the watch dog has to include an interface with the security relevant software which cannot be initiated by errors. It is not sufficient to write an accidental value at a particular memory address. Instead, for example, a computation predetermined by the watch dog can be performed or a particular key can be written to a particular memory address.

The non-secure component has full access to all I/O units also beyond the watch dog and can thus also control security relevant actuators or sensors. In order to solve this problem a respective access protection has to be implemented in the particular units outside of the system. Alternatively it is also conceivable to address all security relevant units through a particular external communication interface and to implement the access protection in the communication inner face.

Reference numerals in the description and the drawings are only intended to better understand the invention and do not restrict limit the scope of the invention which is only defined by the appended patent claims.

REFERENCE NUMERALS AND DESIGNATIONS 1 control unit
2 control unit
3 control unit
4 control unit
4' flight control computer (FFC)
10 processor
11 operating system
12 first control unit
13 second control unit
14 sensor
15 sensor
16 actuator
17 actuator
20 processor
21 processor
22 operating system
23 operating system
24 control unit
25 control unit
26 sensor
27 sensor
28 actuator
29 actuator
30 hardware configuration
31 hardware configuration
32 control unit
33 operating system
34 control unit
36 sensor
37 sensor
38 actuator
39 actuator
40 processor
40' PPC
42 operating system
42' operating system
43 control unit
43' data link monitoring
44 control unit
44' control unit
45 watch dog
45' hardware monitoring
46 sensor
46' data link receiver
47 sensor
47' seeker head
47" inertial measuring unit
48 actuator
48' actuator
49 actuator
49' actuator

What is claimed is:

1. A method for memory space management in a multitasking capable data processing system comprising the steps of:
providing an operating system, wherein the data processing system includes a data processing device and software running thereon, and wherein the data processing device includes at least one central processing unit and at least one user memory;
providing a security relevant control unit and a non-security relevant control unit within the data processing system, wherein the security relevant control unit is separated from the operating system and is separated from the non-security relevant unit, and wherein the software running on the at least one central processing unit includes the first computer program application dealing with the security relevant control unit and at least a second computer program application dealing with the non-security relevant control unit which respectively jointly access the at least one user memory used by both computer program applications during execution;
storing information of the first computer program application in at least a portion of memory space of the at least one user memory in a temporary manner;
computing a check sum for the information of the first computer program application before storing the information of the first computer program application in the storage space of the at least one user memory and storing the check sum together with the information, and after reading the information from the memory space of the at least one user memory as a result of an interruption due to malfunction and before further processing the information in the first computer program application, computing the check sum again, comparing the check sum with the stored check sum, and verifying the memory integrity when both checksums coincide;

executing the first computer program application further when the memory integrity is confirmed through the checking or when the memory integrity has been reestablished;

providing an independent scheduler for the security relevant control unit, wherein the independent scheduler manages tasks to be performed by the first computer program application and the independent scheduler is independent from other schedulers for managing other computer program applications running on the data processing device;

turning off all interrupt routines which are capable of interrupting the first computer program application before calling up the information of the first computer program application stored in the memory space of the user memory after calling up the independent scheduler for the first computer program application initially; and turning the interrupt routines on again through the independent scheduler only when at least one of the tasks to be performed by the first computer program application has been performed and the information of the first computer program application has been stored again in the storage space of the user memory.

2. The method according to claim 1, further comprising the steps of:

executing the first computer program application in a loop;

before reading the information from the memory space of the at least one user memory and computing the check sum turning off all interrupt routines which are capable of interrupting the first computer program application; and turning the interrupt routines on again only when the information is stored in the at least one user memory again after computing the new check sum.

3. The method according to claim 1, further comprising a monitoring unit separate from the data processing system.

4. The method according to claim 3, wherein the checking an integrity of contents of the memory space does not occur in the non-security relevant control unit.

5. The method according to claim 1, wherein the operating system has services and functions; and wherein the security relevant control unit does not use the services and functions of the operating system.

6. The method according to claim 1, further comprising the steps: storing the information of the first computer program application at least twice in the memory space of the at least one user memory as first information and second information, and after reading out the first information from the storage locations of the at least one user memory and before processing the information further in the first computer program application comparing the first information to the second information that IS stored In parallel and verifying the memory integrity when there is coincidence.

7. The method according to claim 1, wherein the first information includes data and commands; and wherein the second information includes data and commands.

* * * * *